June 4, 1929.　　　O. D. MANSFIELD　　　1,716,070
HEADLIGHT ATTACHMENT
Filed Oct. 10, 1927
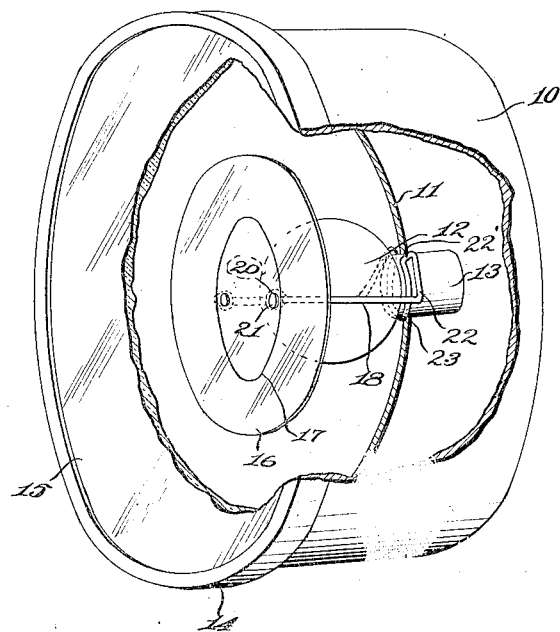
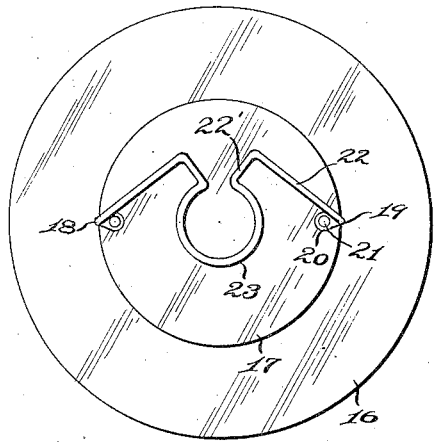
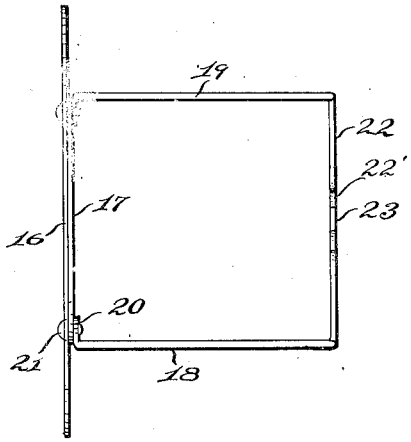
Inventor
Orrin D. Mansfield
by Hazard and Miller
Attorneys Patented June 4, 1929.

1,716,070

UNITED STATES PATENT OFFICE.

ORRIN D. MANSFIELD, OF GLENDALE, CALIFORNIA, ASSIGNOR TO RENA N. CURL, OF GLENDALE, CALIFORNIA.

HEADLIGHT ATTACHMENT.

Application filed October 10, 1927. Serial No. 225,169.

This invention relates to an attachment for headlights such as are used upon automobiles.

An object of the invention is to provide a device of improved construction for eliminating glare from the headlight and causing the headlight to throw a uniform light giving a clear, broad side light which will adequately illuminate the sides of the road.

Another object of the invention is to provide a glare shield for automobile headlights which is formed of semitransparent material and which has variations in colors so that the portion of the glare shield having the darkest color is arranged adjacent the center of the headlight to cut off the majority of glaring rays, and which has the portions of lighter color arranged about the portion of dark color to cut off the fewer glaring rays near the edges of the headlight, but enabling the desired amount of light to pass therethrough.

Another object of the invention is to provide a glare shield for automobile headlights which is neat and attractive in appearance, and which may be easily and quickly applied to any form of automobile headlight now in general use.

A further object of the invention is to provide a device which is of simple and durable construction, and which is adapted to be attached to the electric lamp forming the light source for the headlight, and which will not hinder the replacement of the electric lamp in the event that the lamp is broken or becomes burned out.

With the foregoing and other objects in view which will be made manifest in the following detailed description and specifically pointed out in the appended claims, reference is had to the accompanying drawings for an illustrative embodiment of the invention, wherein:

Figure 1 is a perspective view, parts being broken away, of a headlight illustrating the invention as having been applied thereto.

Fig. 2 is a rear view in elevation of the glare shield embodying the invention.

Fig. 3 is a top plan view of the glare shield as shown in Figure 2.

Referring to the accompanying drawings wherein similar reference characters designate similar parts throughout, the headlight illustrated in Figure 1 may be of any conventional construction and is shown as having a shell 10 within which there is a parabolic reflector 11, at the center of which is removably mounted an electric lamp 12 having a base or plug 13. On the front of the shell 10 there is a removable rim 14 which carries a glass or lens 15. The glare shield embodying the invention consists of two sections 16 and 17 of semi-transparent material. The material preferably employed for these sections is colored celluloid, but it will be understood that any other suitable material which is colored to cut off glaring rays may be used for these sections. These sections are in the form of circular discs, the outer section 16 being materially greater in size than the inner or rear section 17. The forward section 16 is preferably of an amber color, while the rear section 17 is preferably of a green color for a purpose hereinafter to be described. On the rear of the two discs there is positioned a mounting construction consisting of a single strand of heavy resilient steel wire bent to provide two rearwardly extending arms 18 and 19 having their forward ends flattened and bent toward each other as indicated at 20. Holes are formed through these inwardly bent ends and through the sections 16 and 17 on opposite sides on a horizontal diameter of the smaller section 17. Rivets 21 which have large heads on their forward ends, serve to connect the two discs 16 and 17 to each other and to the inwardly bent ends 20. The rear ends of the arms are bent upwardly toward each other as indicated at 22, and then downwardly and toward each other as indicated at 22'. They are then joined by a central part 23 which is semi-circular in form but which is somewhat greater than a semi-circle. This construction enables the improved glare shield to be applied to a headlight as follows:

The rim 14 with its lens 15 is removed from the shell 10, and the glare shield is positioned within the shell with the open side of the semi-circular portion 23 positioned below the bottom of the plug or base 13 of the lamp 12. As the wire forming the arms 18 and 19 and the portion 23 is resilient, the sides of the semi-circular portion 23 can be sprung apart, enabling this portion to be snapped over the base 13 of the lamp 12 immediately forward of the center of the parabolic reflector 11. In this manner the lamp 12 will support the glare shield in a position within the shell 10 forwardly of the lamp. As clearly shown in Figure 2, the inwardly bent ends 20 of the arms 19 are horizontally even with the center of curvature of the semi-circular portion 23, so that the centers of both discs 16 and 17 will be horizontally even with the center of the lamp 12. The central portion 23 is preferably so arranged on the base of the lamp that it will be about 1/8" back of the glass on the lamp so that it will not contact with the glass. The interior surface of the semi-circular portion 23 is preferably flattened so that it will fit snugly against the cylindrical surface on the base of the lamp. In this manner the glare shield will be supported by the base of the lamp and held forwardly of the lamp horizontally even with the filament in the lamp. As the disc 17 is of a dark green color, most of the glaring rays of light which are thrown from the headlight through the center of the lens 15 are cut off thereby. The surrounding portion of the large disc 16 which is of amber color, cuts off the few glaring rays of light which pass through the lens 15 more adjacent its edges, but enables a greater amount of light to be thrown from the headlight through the projecting portions of this disc than will be allowed to pass through the center portions of the discs 16 and 17. In this manner, the headlight will be caused to throw a uniform light and to give a clear, broad side light which will effectively illuminate the sides of the road over which the automobile may be traveling. The glare shield being colored, will cause the light thrown from the headlight to be colored to some extent. Ordinarily, this change in color from a white light ordinarily thrown from a headlight is not noticeable. However, in driving through a fog or light mist, the change in color from a white light to an amber color is more noticeable and is quite advantageous. As the fog is naturally white, a white light shining through it will not illuminate dark objects which are perceptible from any great distance ahead, to the driver's eyes. However, when an amber light is shown through the white fog, it is found in practice that it is possible to discern dark objects through the fog a greater distance ahead.

From the above described construction it will be appreciated that a novel and advantageous glare shield is provided for headlights which can be easily and quickly installed upon headlights now in use. If the electric lamp 12 should become broken or burnt out, the glare shield can be easily snapped off of the old lamp and a new lamp substituted for it, after which the glare shield may be snapped on the new lamp. It will also be noted that the colors given to the discs 16 and 17 cause the glare shield to have a very neat and attractive appearance.

Various changes in the details of construction may be made without departing from the spirit or scope of the invention as defined by the appended claims.

I claim:

1. In a headlight attachment, a glare shield comprising a colored semi-transparent screen, and means for positioning said shield comprising a wire bent to form a clamp at the center portion thereof, said clamp describing an arc greater than 180°, a laterally extending section of said wire disposed upon each side of said clamp, and an arm extending forwards from each of said laterally extending sections and attached to said screen.

2. In a headlight attachment, a glare shield comprising an amber translucent disc and a green translucent disc smaller than and arranged concentrically of said amber disc, and means for positioning said shield comprising a wire bent to form a clamp at the center portion thereof, said clamp describing an arc greater than 180°, a laterally extending section of said wire disposed upon each side of said clamp, and an arm extending forwards from each of said laterally extending sections and attached to said screen.

3. A headlight attachment comprising a plurality of sections of semi-transparent material, arranged one behind the other, said sections being of different colors, arms extending rearwardly from said sections, means securing said sections together and to said arms, said arms being connected together at their rear ends by a part, arcuate in form and slightly greater than a semicircle, enabling the part to be sprung over the base of an electric lamp of a headlight, to support the sections forwardly of the lamp.

4. A glare shield for headlights, comprising a colored semitransparent screen, means for positioning said screen, comprising a single strand of wire bent to form a clamp in the center thereof, said clamp being arcuate and somewhat greater than a semicircle, said strand being bent to form divergent portions in the entrance to said semicircle, and arms extending forwardly from the clamp and attached to said screen.

In testimony whereof I have signed my name to this specification.

O. D. MANSFIELD.